United States Patent [19]

Cartier et al.

[11] 4,027,061
[45] May 31, 1977

[54] LAMINATED SAFETY GLASS

[75] Inventors: George E. Cartier, Springfield; James A. Snelgrove, Monson, both of Mass.

[73] Assignee: Monsanto Company, St. Louis, Mo.

[22] Filed: Nov. 18, 1975

[21] Appl. No.: 632,933

[52] U.S. Cl. .............................. 428/213; 428/339; 428/424; 428/437; 428/447; 428/500
[51] Int. Cl.² ................... B32B 17/10; B32B 27/08
[58] Field of Search .......... 428/445, 451, 500, 520, 428/437, 426, 424, 425, 213, 447, 448; 260/825

[56] References Cited

UNITED STATES PATENTS

| | | | |
|---|---|---|---|
| 2,653,884 | 9/1953 | Hussey et al. | 428/500 |
| 3,008,848 | 11/1961 | Annonio | 427/407 A |
| 3,437,628 | 4/1969 | Isley et al. | 264/211 |
| 3,476,827 | 11/1969 | Engelhardt | 260/825 |
| 3,762,981 | 10/1973 | Blank | 428/437 |

FOREIGN PATENTS OR APPLICATIONS

| | | | |
|---|---|---|---|
| 2,134,119 | 8/1972 | France | 428/424 |
| 2,134,255 | 8/1972 | France | 428/424 |

OTHER PUBLICATIONS

B456,069, Mar. 1976, Kaas, 428/520.
Hughes et al., "Transparent Barrier Resins with High Nitrile Content" Jour. App. Poly. Sci. (13) 2567–2577 (1969).

*Primary Examiner*—George F. Lesmes
*Assistant Examiner*—R. J. Roche
*Attorney, Agent, or Firm*—W. J. Farrington; J. C. Logomasini; S. M. Tarter

[57] ABSTRACT

Disclosed herein is a laminated glazing unit for vehicle and architectural uses which comprises glass, an interlayer and a high nitrile polymer in a laminated configuration wherein the interlayer is sandwiched between the glass and the high nitrile polymer.

14 Claims, 4 Drawing Figures

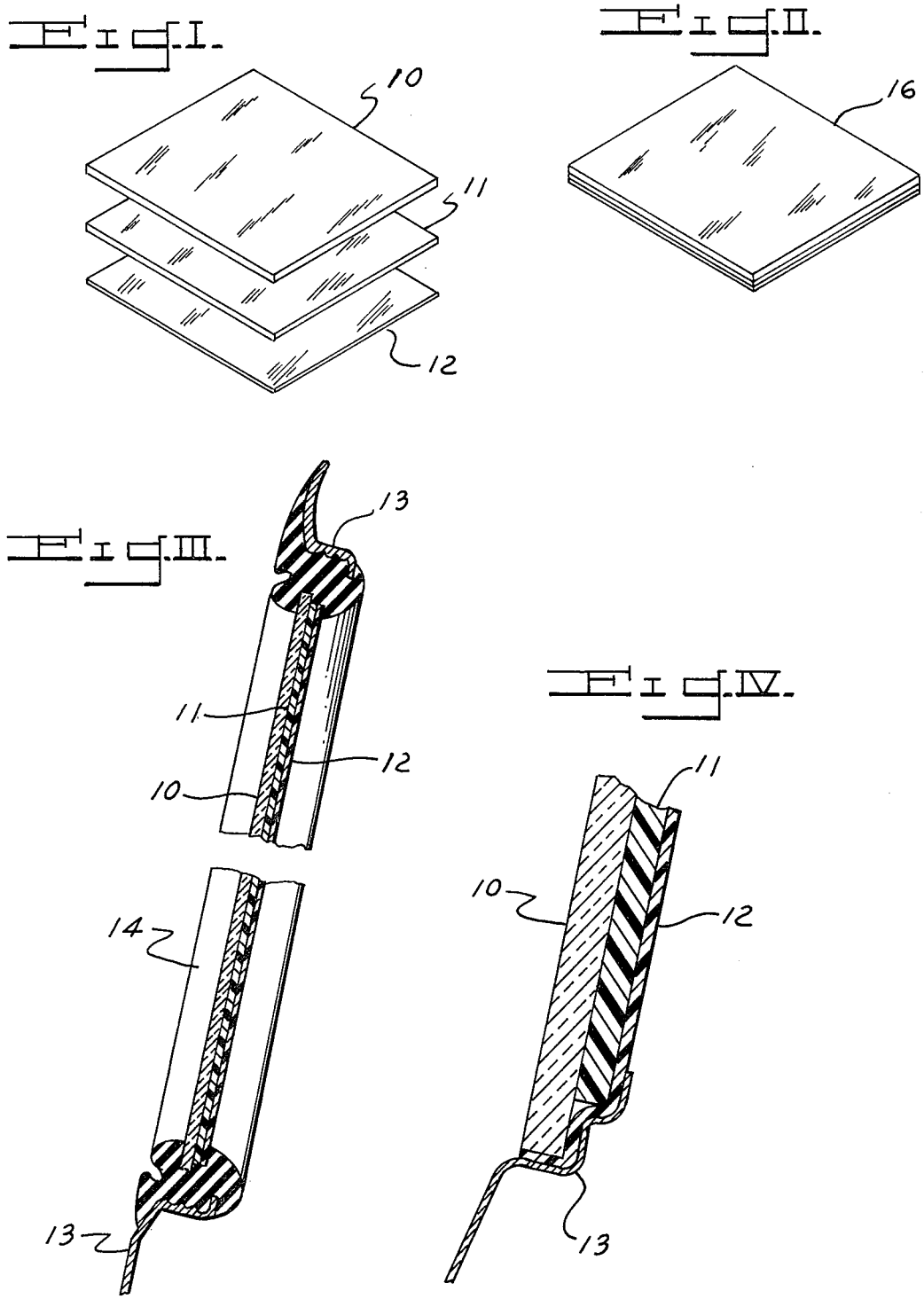

LAMINATED SAFETY GLASS

BACKGROUND OF THE INVENTION

1. Field of the Invention

The present invention relates to laminated safety glass of the type found in vehicles, e.g., windshields and in architectural applications, e.g., windows and doors. More particularly, the present invention relates to laminated safety glass wherein an interlayer material is sandwiched between a glass sheet and a high nitrile polymer layer.

2. Description of the Prior Art

Laminated safety glass prepared by laminating a thermoplastic interlayer between two sheets of glass is well known in the prior art. Such laminates are widely used in automobile windshields and in windows and doors in architectural applications.

In recent years there has been a growing interest in laminated safety glass wherein only one sheet of glass is used, usually on the outboard side, (i.e., the side of the laminate that faces the outside of the vehicle or architectural structure). The inboard glass sheet (i.e., the glass sheet that faces the interior of the vehicle or the architectural structure) is not used. The result is a glass/plastic laminate which is sometimes referred to as a bilayer or a bimodal laminate. The plastic component of the bilayer may be a single sheet or a composite of two or more components. These include a plastic component which is coated with another material, two or more plastic components laminated together, and various combinations of the above. Examples of such bilayer or bimodal construction are taught in U.S. Pat. Nos. 3,625,792, 3,652,379, 3,762,981, 3,781,184, 3,806,387, 3,900,673, 3,900,686 and Belgian Pat. No. 803,902.

Bilayer of bimodal laminated safety glass constructions have received widespread interest because of the weight reduction made possible by eliminating one sheet of glass and because a person who collided with the laminate from the inboard side would tend to suffer less serious injuries by hitting a plastic component rather than a glass component. However, the dropping of the inboard glass sheet in laminated safety glass has given rise to new problems. The thermoplastic interlayer, which was previously encased by the protective glass components, is now exposed to the atmosphere. The interlayer is now more susceptible to oxidative degradation and moisture pickup which may adversely affect the properties of the plastic sheet. Moreover, plastic sheets which are plasticized in order to obtain optimum physical properties may suffer from loss of plasticizer and a deterioration of properties. It has been proposed in the prior art to cover the plastic sheet with a protective coating or a protective layer. Many of the suggested coatings do not provide the desired level of barrier protection to the plastic sheet. Thus, a need exists in the art for a bilayer laminated safety glass wherein the plastic sheet, which is in laminated contact with the glass sheet, is protected from the atmosphere and other possible sources of degradation. A further need exists in the art for a bilayer laminated safety glass wherein the plastic sheet is protected from plasticizer loss as well as from degradation.

SUMMARY OF THE INVENTION

The needs in the prior art are fulfilled by the present invention which provides an improved laminated safety glass construction which comprises a glass sheet laminated to an interlayer which, in turn, is laminated to a high nitrile polymer layer which provides a barrier for the interlayer while minimizing the loss of plasticizer from plasticized interlayers.

DESCRIPTION OF THE DRAWINGS

FIG. 1 is an exploded view illustrating the glass sheet 10, plastic sheet 11, and the high nitrile polymeric material 12 which form a laminated safety glass of the present invention.

FIG. II illustrates a laminated safety glass 16 of the present invention prepared from the components shown in FIG. I.

FIG. III is a cross section of an automobile windshield 14 prepared using the composites of the present invention. The composite is prepared from co-extensive layers of glass 10, plastic sheet 11 and a high nitrile polymeric material 12. The edges of the laminate are embedded in a rubbery mounting frame 13 which seals the edges of the laminate against the weather. The mounting frame 13 then becomes an integral part of the vehicle or the architectural construction.

FIG. IV illustrates a variation of the laminated glazing unit of FIG. III, wherein the high nitrile layer 12 is larger than the glass sheet 10 and the plastic sheet 11. The extended edges of the nitrile polymer component are wrapped around the edge of the glazing unit prior to embedding the edges in the mounting frame 13.

DESCRIPTION OF THE PREFERRED EMBODIMENTS

The plastic sheet material used as the interlayer in laminated safety glass may be prepared from various synthetic polymers. Examples of such polymers include polyvinyl butyral, polyurethane, poly(ethylene-vinyl acetate), poly(ethylene-vinyl acetate-vinyl alcohol), poly(ethylene-methyl-methacrylate-acrylic acid), etc. The preferred materials are plasticized polyvinyl butyral and polyurethane with plasticized polyvinyl butyral being especially preferred. These materials are well known to those skilled in the art.

The preferred polyvinyl butyral materials have Staudinger molecular weights ranging from about 50,000 to 600,000 and preferably from 150,000 to 270,000 and may be considered to be made up on a weight basis, of from 10 to 30 percent hydroxyl groups, calculated as polyvinyl alcohol, 0 to 40 percent ester groups, calculated as polyvinyl ester, and the balance substantially butyral groups. The polyvinyl butyral resin will preferably contain, on a weight basis, from 12 to 25 percent hydroxyl groups, calculated as polyvinyl alcohol and from 0 to 3 percent acetate groups, calculated as polyvinyl acetate, the balance being substantially butyral groups.

The polyvinyl butyral resin used may be plasticized with from about 10 to 80 parts plasticizer per hundred parts of resin and more commonly between 15 and 45 parts for normal windshield use. This latter concentration is generally used with polyvinyl butyrals containing 15 to 24 percent by weight of hydroxyl groups. In general, the plasticizers which are commonly employed are esters of a polybasic acid or a polyhydric alcohol. Particularly suitable plasticizers are triethylene glycol di-2-ethylbutyrate, dibutyl sebacate, polymeric plasticizers such as the oil modified sebacic alkyds, dihexyl adipate, dioctyl adipate, mixtures of heptyl and nonyl adipates and mixtures of phosphates and adipates such as are disclosed in U.S. Pat. No. 3,841,890.

Other suitable plasticizers are well known or obvious to those skilled in the art.

The preferred polyurethane materials are those described in U.S. Pat. Nos. 3,620,904, 3,823,060 and Belgian Pat. No. 785,125, which are incorporated herein by reference.

The high nitrile polymers used in the present invention contain 55 to 100 percent by weight of a nitrile monomer unit, based on the total polymer weight. The preferred nitrile monomers include acrylonitrile, methacrylonitrile, ethacrylonitrile, propacrylonitrile, glutaronitrile, methylene-glutaronitrile, fumaronitrile, etc., as well as mixtures of these monomers. Polyacrylonitrile and polymethacrylonitrile are the preferred homopolymers, i.e., those containing 100 percent by weight of a nitrile monomer unit. The preferred monomers which are interpolymerized with the nitrile monomers include aromatic monomers such as styrene and alpha-methyl-styrene; lower alpha-olefins containing 2 to 6 carbon atoms such as ethylene, propylene, butylene, isobutylene, etc,; acrylic acid and methacrylic acid and the corresponding acrylate and methacrylate esters containing 1 to 8 carbon atoms such as methyl acrylate, ethyl acrylate, propyl acrylate, butyl acrylate, 2-ethylhexyl acrylate and the corresponding methacrylates; vinyl esters such as vinyl acetate; alkyl vinyl ethers wherein the alkyl group contains from 1 to 4 carbon atoms such as methyl vinyl ether, ethyl vinyl ether, etc., and mixtures of the foregoing. The preferred monomers are styrene, alpha-methylstyrene methyl acrylate, ethyl acrylate and vinyl acetate.

Optionally, the high nitrile polymers may from 0 to 25 percent by weight of a synthetic or natural rubber component such as polybutadiene, isoprene, neoprene, nitrile rubbers, acrylate rubbers, natural rubbers, acrylonitrile-butadiene copolymers, ethylene-propylene copolymers, chlorinated rubbers, etc., which is used to strengthen or toughen the high nitrile polymer. This rubbery component may be incorporated into the high nitrile polymer by any of the methods which are well known to those skilled in the art, e.g., direct polymerization of monomers, grafting the nitrile monomer onto the rubbery backbone, polyblend of a rubber graft polymer with a matrix polymer, etc.

The preferred nitrile polymers for use in the present invention are those nitrile polymers without rubber modification. These polymers may also be uniaxially or biaxially oriented.

The excellent barrier properties of the nitrile polymers are well known to those skilled in the art as is evidenced by U.S. Pat. Nos. 3,451,538, 3,580,974, 3,615,710, 3,790,684, etc.

The laminated glazing units of the present invention are prepared by assembling the glass sheet, the interlayer material and the high nitrile polymer component and then laminating the three together using conventional laminating techniques.

Alternately, the interlayer material and the high nitrile polymer are bonded together to form a unitary structure prior to forming the glass/interlayer/high nitrile polymer composite. This may be accomplished by laminating the interlayer to a film or sheet of the high nitrile polymer using heat and pressure or by using suitable adhesives. When using heat and pressure a temperature of at least 330° F. (166° C.) is used in order to obtain good adhesion of the nitrile polymer to the interlayer. The upper limit of the laminating temperature range will depend upon the degradation temperature of the synthetic polymer component and the pressure used. The pressures used to make the laminate are selected so as to obtain a satisfactory bond without adversely deforming or degrading the synthetic polymer components. In general these pressures will be in the range of from 730 to 2200 psi (50 to 150 kg/sq. cm.). Alternately, when using nitrile copolymers that are melt extrudable, either the interlayer material or the high nitrile polymer may be melt extruded onto a preformed film or sheet of the other component. In another method the interlayer and melt extrudable high nitrile copolymer components are co-extruded to form a composite. In still another method a solution or dispersion of either the interlayer material or the high nitrile polymer component is applied to a preformed film or sheet of the other component followed by removal of the solvent or dispersion medium. Other methods for forming composites will be obvious to those skilled in the art upon reading the present specification. The preferred methods are bonding the materials together using heat and pressure, by extruding one material onto the other or by co-extrusion or bi-extrusion methods.

Preferably, the thickness of the interlayer component of the composite is in the range of from 125 to 1875 microns (5 to 75 mils) in order to obtain the desired degree of structural rigidity and impact.

Preferably, the thickness of the high nitrile polymer component is in the range of from about 12 to 500 microns (0.5 to 20 mils). More preferably, the high nitrile polymer component has a thickness in the range of from about 50 to 250 microns (2 to 10 mils) for resistance to deformation and ease of fabrication when using lamination (heat and pressure), co-extrusion and bi-extrusion methods to form the interlayer/high nitrile polymer assembly.

The plastic interlayer sheet/high nitrile polymer composites used in the present invention should have a bond strength sufficient to enable the composite to maintain its integrity during the construction operation, e.g., handling, assembly, lamination and thereafter without any substantial separation. The composite should have a bond strength such that a force of at least 178.6 gms/cm and preferably 357.2 gms/cm is required to separate the individual components of the composite. These bond strengths are readily achieved using the methods outlined herein.

In the preferred embodiments of the present invention an adhesion promoter is used between the high nitrile polymer film and the interlayer component. The preferred adhesion promoters are gamma-aminopropyl triethoxy silane which is commercially available as A-1100 from Union Carbide and a polyamino-functional silane $((CH_3O)_3SiC_3H_6NH-(NHC_2H_4-)_n)$ which is commercially available as z-6050 from Dow Corning. These materials and methods for their use in the present invention are described in greater detail below.

For use in certain applications, it may be desirable or even necessary to protect the exposed surface of the high nitrile polymer component used in the laminates of the present invention with an abrasion resistant coating. The preferred coatings are polyurethanes and solutions based on polysilicic acid and polyvinyl acetals as are described in U.S. Pat. No. 3,476,827. These abrasion resistant coatings and methods for their application are described in greater detail below.

BOND STRENGTH TEST

Bond strengths are determined by coating 10 mil (250 microns) high nitrile polymer film with gamma-aminopropyl triethoxy silane so as to achieve a dry basis coating weight of about 0.07 mg/sq.in. (0.01 mg/sq.cm.). The silane coating is air dried and then oven dried for 10 minutes at 80° c. and the laminate assembly is prepared by sandwiching a conventional interlayer material between a sheet of glass and the coated surface of the nitrile polymer film. The assembly is then placed between two pieces of corrugated paper board and then pressed in a heated hydraulic press at 50 psi (3.5 kg/sq.cm.) for 5 minutes. The laminate is then cooled in the press for 8 to 10 minutes and conditioned overnight at 22° C. and 50 percent relative humidity. The nitrile polymer film is then peeled from the interlayer using an Instron tester and a 90° peel angle. If a high nitrile polymer film, having a thickness of 125 microns or greater, breaks continuously during this test, then the glass portion of the laminate is separated from the other components and the high nitrile polymer film is then peeled from interlayer material using an Instron tester and 180° peel angle.

ABRASION TESTS

Abrasion resistant tests are carried out using a Taber Abraser according to the methods outlined in U.S. AS Z-26.1 — 1966, paragraph 5.17, Abrasion Resistant Test No. 17. This test is also referred to as ASTM-D-1044-73. The abrasion tests reported herein are those values measured after 300 revolutions. The abrasion resistance is reported in terms of % haze increase in the abraded surface. The preferred abrasion resistant coatings used in the present invention exhibits a % haze increase of less than 10 percent, preferably less than 5 percent.

The following examples are set forth in illustration of the present invention and should not be construed as limitations thereof. All parts and percentages given are by weight unless otherwise specified.

EXAMPLE 1 (Control)

This example illustrates the preparation of a bilayer wherein a plasticized polyvinyl butyral sheet is sandwiched between a glass sheet and a nitrile polymer film. It further illustrates the need for an adhesion promoter between the nitrile polymer and the polyvinyl butyral sheet.

The polyvinyl butyral sheet used is a conventional interlayer which is approximately 30 mils (750 microns) thick. The particular material used has a hydroxyl content in the range of from 18 to 22 percent by weight and a residual acetate content of less than 3 percent by weight with the balance being butyral groups. The polyvinyl butyral is plasticized with 44 parts per hundred parts of resin of triethylene glycol di-2-ethyl butyrate. The high nitrile polymeric film is a copolymer of acrylonitrile and styrene containing 63 percent by weight of acrylonitrile and 37 percent by weight of styrene, having a thickness of 1 mil (25 microns). The laminates are prepared using a press temperature of 330° F. (166° C.) and 180 psi (12.7 kg/sq.cm.).

The bond strength of the assembly is tested as outlined above and found to be 5.4 gms/cm width. This low level of adhesion indicates the need for an adhesion promoter.

EXAMPLE 2

Example 1 is repeated here except that the high nitrile polymer film is coated with a gamma-aminopropyl triethoxysilane which is available commercially as A-1100 from Union Carbide in order to obtain a dry basis coating weight of about 0.07 mg/sq.cm.). During the peel strength test the nitrile polymer film (25 microns) tears indicating that excellent adhesion is obtained between the high nitrile polymer film and the polyvinyl butyral sheet.

EXAMPLE 3

Example 2 is repeated here except that the high nitrile polymer film has a thickness of 5 mils (125 microns). The peel strength of the nitrile polymer film to the polyvinyl butyral sheet is 715 gm/cm width.

EXAMPLE 4 (Control)

Examples 2 and 3 are repeated except that the lamination of the assembly is made at temperatures of about 300° F. (150° C.). Very low adhesion (less than 6 gm/cm width) of the nitrile film to the polyvinyl butyral sheet is obtained in each case due to the low laminating temperature.

EXAMPLES 5 to 11 (Control)

Example 3 is repeated here using various commercially available adhesion promoters. These adhesion promoters and the results of the peel tests are tabulated in Table I below.

TABLE I

| | SUMMARY OF EXAMPLES 5 to 11 | |
|---|---|---|
| | 150° C. Laminating Temperature Peel Strength | 166° C. Laminating Temperature Peel Strength |
| Ex. Adhesion Promoters | (Grams/Cm.) | (Grams/Cm.) |
| 5 Polyaminofunctional silane (1) | 48.2 | 428.9 |
| 6 Aminofunctional polydimethyl siloxane | 5.4 | 5.4 |
| 7 Gamma-mercaptopropyl trimethoxy silane | 5.4 | 23.7 |
| 8 Vinyl-tri(tertiary-butyl peroxy)silane | 5.4 | 7.6 |
| 9 Vinyl-triacetoxy-silane | 3.6 | 6.8 |
| 10 Vinyl-tris(2-methoxyethoxy)silane | 3.6 | 6.3 |
| 11 Beta-(3,4-epoxy-cyclohexyl)ethyl-trimethoxysilane | 7.2 | 8.9 |

(1) available commercially as Z-6050 from Dow Corning.

A comparison of the data in Table I above with the peel strength reported in Examples 2 and 3 shows the superiority of using gamma-amino-propyl triethoxysilane or polyaminofunctional silane in order to promote adhesion between the high nitrile polymer film and the polyvinyl butyral interlayer.

EXAMPLES 12 to 21

Examples 12 to 21 illustrate laminates prepared from other nitrile polymer films. In each example a polyvinyl butyral sheet is used as the interlayer.

The composition of the nitrile polymers used in these examples are summarized in Table II below.

TABLE II

SUMMARY OF NITRILE POLYMER COMPOSITIONS USED IN EXAMPLES 12 to 21

| Example | Nitrile Polymer Composition (1) |
|---|---|
| 12 | Polyacrylonitrile 100 |
| 13 | Acrylonitrile/styrene 70/30 |
| 14 | Acrylonitrile/vinyl acetate 91/9 |
| 15 | Acrylonitrile/2-ethylhexyl acrylate 77/23 |
| 16 | Acrylonitrile/2-ethylhexyl acrylate 60/40 |
| 17 | Acrylonitrile/2-ethylhexyl acrylate/acrylic acid 86/6/8 |
| 18 | Acrylonitrile/2-ethylhexyl acrylate/acrylic acid 75/20/5 |
| 19 | Acrylonitrile/2-ethylhexyl acrylate/acrylic acid 60/35/5 |
| 20 | Acrylonitrile/styrene 63/37, 5% grafted butadiene rubber |
| 21 | Acrylonitrile/styrene 63/37, 10% grafted butadiene rubber |

(1) Numbers given are percent by weight of the respective monomers used in the nitrile polymer. The rubber used in Examples 20 and 21 is a butadiene/styrene (70/30) rubber which is grafted with acrylonitrile/styrene (63/37).

A variety of polyvinyl butyral sheets are used in combination with the above nitrile polymer compositions. The hydroxyl content of the butyral resins varies from about 18 to about 23 percent. Plasticizer levels of 21, 33 and 44 parts per hundred parts of polyvinyl butyral resin are used. Dihexyl adipate at a level of 33 parts is used with a polyvinyl butyral resin having a hydroxyl content of about 18 percent. The other polyvinyl butyral resins are plasticized with either 21 parts or 44 parts per hundred parts of resin of triethylene glycol di-2-ethyl butyrate.

EXAMPLE 22

This example illustrates abrasion resistant coatings on the nitrile polymer component of laminates of the type described in Examples 2 and 3 above.

A coating solution is prepared from polysilicic acid and polyvinyl butyral according to the procedure set forth in Example 1 of U.S. Pat. No. 3,476,827 which is incorporated herein by reference.

The coating solution is applied to the exposed surface of the high nitrile polymer component using a coating weight of about 0.07 gm/cm (dry basis). The coating solution is air dried and then oven dried at 150° C. for 30 minutes. The laminates are then conditioned overnight at a temperature of 22° C. and 50 percent relative humidity before being evaluated in the abrasion test described above. After a cycle of 300 revolutions the abraded surface is evaluated. The results of this test are tabulated in Table III below.

TABLE III

SUMMARY OF ABRASION RESISTANCE TEST USING A POLYVINYL BUTYRAL/POLYSILICIC ACID COATING

| Sample Tested | % Haze Increase |
|---|---|
| Glass control | 0 – 1 |
| Uncoated nitrile polymers | 17 – 35 |
| Coated nitrile polymers | 1 – 2 |

The above data illustrate that polymers coated with the abrasion resistant coating have a high order of abrasion resistance. The uncoated acrylonitrile/2-ethylhexyl acrylate/acrylic acid polymer of Example 17 had a haze increase of 17 percent which represented the lower end of the range for those samples tested. On the higher end of the range were the acrylonitrile/styrene copolymers of Examples 2, 3 and 13 which showed a haze increase of about 35 percent. The other polymers tested were intermediate between these values.

In preparing the polysilicic acid-polyvinyl butyral coating abrasion resistant coating compositions the weight ratio of polysilicic acid to polyvinyl butyral may be varied from 2:1 to 8:1. When the ratio of polysilicic acid to polyvinyl butyral lies outside of these ratios the abrasion resistance decreases. The preferred ratio for optimum resistance is about 4:1 to 6:1. The preferred coating weights are from 0.03 to 0.12 mg/cm.

EXAMPLES 23 and 24

These examples illustrate the use of polyurethane films as overlays over the exposed surface high nitrile polymer in order to protect the high nitrile polymer from abrasion. Example 23 uses a commercial polyurethane film having a thickness of 1 to 2 mils which is available commercially as Tuftane film from the B. F. Goodrich Company. Example 24 uses a 10 mil polyurethane film of the type described in Example 3 of U.S. Pat. No. 3,900,446. Laminates are prepared by laying up an assembly of glass/polyvinyl butyral sheet/high nitrile polymer/polyurethane. The surface of the high nitrile polymer in contact with the polyvinyl butyral sheet is coated with gamma-aminopropyl triethoxy silane as described above. The entire assembly is laminated as described above and then conditioned overnight at 22° C. and 50 percent relative humidity prior to being evaluated in the abrasion test. The percent haze increase for these samples is less than 10 percent for each sample.

EXAMPLES 25 to 32 (Control)

Abrasion tests are run on various polymeric materials which were considered as abrasion resistant layers for the nitrile polymer films of the present invention. These examples are set forth to show the superiority of abrasion resistant coatings used in Examples 22 to 24 above. The results of these abrasion tests are tabulated in Table IV below.

TABLE IV

SUMMARY OF ABRASION TESTS ON EXAMPLES 25 to 32

| Example | Polymer | % Haze Increase |
|---|---|---|
| 25 | Polypropylene | 30 – 35 |
| 26 | Polycarbonate Lexan 9000) | 35 – 40 |
| 27 | Polycarbonate (Lexan MR 4000) | 17 – 22 |
| 28 | Homalite CR-39 Diethylene glycol bis-allyl carbonate | 27 – 35 |
| 29 | Surlyn A (an ethylene methacrylic acid ionomer) | 64 – 66 |
| 30 | Poly(ethylene methylmethacrylate acrylic acid) | 60 |
| 31 | Polymethylmethacrylate | 30 |
| 32 | Polyvinyl chloride | 15 – 35 |

A comparison of the % haze increases in Table IV above with those reported in Examples 22 to 24 show the superiority of the polysilicic acid/polyvinyl butyral coating and polyurethane films used in Examples 22 to 24.

EXAMPLE 33

Experiments are run to measure the resin viscosity stability of plasticized polyvinyl butyral interlayer under various test conditions. The plasticized polyvinyl butyral interlayer used is the same type as that used in Example 1 above. This material has an initial resin viscosity of 190 centipoises (cps.). In one series of tests a conventional unbuffered polyvinyl butyral resin is used while in another series the resin is buffered with a hundred parts per million of a MacIlvaine's citrate/phosphate buffer system having a pH of 5.5. In one set of samples, conventional laminated safety glass, wherein the polyvinyl butyral resin is sandwiched between two pieces of glass, is used as a control. In another set of samples, the exposed surface of the polyvinyl butyral sheet is covered with a 1 mil film of polyethylene terephthalate (Mylar Film from duPont Company). In a third set of laminates the exposed surface of the polyvinyl butyral film is covered with a 25 micron (1 mil) film of the high nitrile polymer used in Example 2 above. The laminates are then heated for 150 days at 66° C. At the end of this time the viscosity of the polyvinyl butyral resin is measured. The results of these tests are tabulated in Table V below.

TABLE V

| VISCOSITY STABILITY (25 MICRON (1 MIL) FILM) | | |
|---|---|---|
| Cover Sheet | Unbuffered Resin | Buffered Resin |
| Control (glass) | 150 cps. | 169 cps. |
| Polyethylene terephthalate | 51 cps. | 156 cps. |
| Nitrile polymer | 71 cps. | 191 cps. |

Example 33 is repeated here except 125 micron (5 mil) films of polyethylene terephthalate and the nitrile polymers are used. The samples are heated for 60 days at 66° C. The results of these tests are set forth in Table VI below.

TABLE VI

| VISCOSITY STABILITY (25 MICRON (1 MIL) FILM) | | |
|---|---|---|
| Cover Sheet | Unbuffered Resin | Buffered Resin |
| Glass | 148 cps. | 204 cps. |
| Polyethylene terephthalate | 90 cps. | 194 cps. |
| Nitrile polymer | 105 cps. | 190 cps. |

The data in the above Tables indicate that there is a viscosity decrease of about 53 percent when using a 25 micron (1 mil) nitrile polymer film over an unbuffered polyvinyl butyral resin. When using a polyethylene terephthalate film the viscosity decrease is about 55 percent. When the film thickness of the nitrile polymer is increased to 125 microns (5 mils), the viscosity decrease when using the high nitrile polymer is only 29 percent versus about 39 percent when using the polyethylene terephthalate film.

EXAMPLE 35

This example illustrates the barrier properties of the high nitrile polymers to prevent the loss of plasticizer from plasticized interlayers. A series of laminates are prepared by laminating glass/plasticized polyvinyl butyral film/a barrier film/unplasticized polyvinyl butyral/glass. The plasticized polyvinyl butyral film used is the same as that used in Example 2 above while the unplasticized polyvinyl butyral is the same general composition of the plasticized material. The barrier film used has a thickness of about 25 microns, the plasticized polyvinyl butyral has a thickness of about 750 microns, and the unplasticized polyvinyl butyral has a thickness of about 25 microns. The edges of the laminate are sealed with an epoxy resin to prevent plasticizer loss to the outside. The laminates are then heated in an oven at 66° C. After 6 weeks, the samples are analyzed to determine the amount of plasticizer which migrated through the barrier film and into the unplasticized polyvinyl butyral. The results of this study are reported in Table VII below.

TABLE VII

| PLASTICIZER LOSS STUDY | |
|---|---|
| Barrier Film | Plasticizer Gain Six Weeks |
| High nitrile polymer | 3 |
| Polyethylene terephthalate | 2.8 |
| Polyvinyl alcohol | 5 |
| Polyvinyl fluoride | 6 |

The above data indicates the high nitrile polymer is an effective barrier to the triethylene glycol di-2-ethyl butyrate plasticizer.

Laminated glazing units may also be prepared from the interlayer/high nitrile polymer composites of the present invention using rigid transparent plastic materials in place of the glass used in the above examples. Examples of such rigid transparent materials include polymethyl methacrylate, polycarbonate, polyvinyl chloride and other similar materials.

In still a further embodiment, the plastic interlayer/high nitrile polymer composites of the present invention may be applied to one or both sides of conventional laminated safety glass. This method will provide an improvement in the impact properties of the impacted side of conventional laminated safety glass and reduce lacerative potential. However, one would fail to realize the weight reduction which would be obtained by eliminating one glass member of the laminate.

The present invention also contemplates the use of various adjuncts and additives in the interlayer components of the present invention. Such materials would include dyes, pigments, stabilizers, antioxidants, alkalinity titer control agents, adhesion modifiers, etc.

From the foregoing, it should be apparent that many variations and modifications can be made in the present invention without departing from the spirit and scope thereof.

What is claimed is:

1. A laminated glazing unit comprising in laminated combination:
   a. a glass sheet,
   b. a plastic interlayer material selected from the group consisting of polyvinyl butyral and polyurethane; and
   c. a nitrile polymer film having a nitrile monomer content of at least 55 percent by weight wherein the nitrile monomer is selected from the group consisting of acrylonitrile and methacrylonitrile wherein the surface of the nitrile polymer which is laminated to the interlayer is coated with a silane selected from the group consisting of gamma-aminopropyl triethoxy silane and polyaminofunctional silane.

2. A laminated glazing unit as in claim 1 wherein the interlayer is plasticized polyvinyl butyral.

3. A laminated glazing units as in claim 2 wherein the silane is gamma-aminopropyl triethoxy silane.

4. A laminated glazing unit as in claim 3 wherein the nitrile polymer is a copolymer of acrylonitrile and styrene.

5. A laminated glazing unit as in claim 3 wherein the exposed surface of the acrylonitrile polymer is coated with an abrasion resistant coating.

6. A laminated glazing unit as in claim 5 wherein the abrasion resistant coating is based on polysilicic acid and polyvinyl butyral.

7. A laminated glazing unit as in claim 5 wherein the abrasion resistant coating is a polyurethane.

8. A laminated glazing unit comprising in laminated combination:
   a. a glass sheet,
   b. a plasticized polyvinyl butyral interlayer having a thickness in the range of 125 to 1875 microns; and
   c. an acrylonitrile polymer film having an acrylonitrile monomer content of at least 55 percent by weight and a thickness in the range of from 12 to 500 microns;

wherein the surface of the nitrile polymer film which is laminated to the interlayer is coated with a gamma-aminopropyl triethoxy silane.

9. A laminated glazing unit as in claim 8 wherein the exposed surface of the acrylonitrile polymer is coated with an abrasion resistant coating.

10. A laminated glazing unit as in claim 9 wherein the abrasion resistant coating is based on polysilicic acid and polyvinyl butyral.

11. A laminated glazing unit as in claim 9 wherein the abrasion resistant coating is a polyurethane.

12. A laminated glazing unit according to claim 1 in which the nitrile polymer contains up to 25 percent by weight of a synthetic or natural rubber component.

13. A laminated glazing unit comprising in laminated combination:
   a. a glass sheet;
   b. a plasticized polyvinyl butyral interlayer having a thickness in the range of from 125 to 1875 microns; and
   c. an acrylonitrile polymer film having an acrylonitrile monomer content of at least 55 percent by weight and having a thickness in the range of from 50 tp 250 microns;

wherein the surface of the nitrile polymer film which is laminated to the interlayer is coated with a gamma-aminopropyl triethoxy silane; and wherein the exposed surface of the acrylonitrile polymer is coated with an abrasion resistant coating which is selected from the group consisting of polyurethane and coatings based on polysilicic acid and polyvinyl butyral.

14. A laminated glazing unit according to claim 13 in which the acrylonitrile polymer contains up to 25 percent by weight of a grafted butadiene rubber.

* * * * *